(12) United States Patent
Achanta et al.

(10) Patent No.: US 7,870,170 B2
(45) Date of Patent: Jan. 11, 2011

(54) METHOD AND APPARATUS FOR DETERMINING LEAKS IN A JAVA HEAP

(75) Inventors: Phani Gopal V. Achanta, Austin, TX (US); Robert Dimpsey, Kirkland, WA (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 11/121,129

(22) Filed: May 3, 2005

(65) Prior Publication Data

US 2006/0253845 A1 Nov. 9, 2006

(51) Int. Cl.
*G06F 12/00* (2006.01)
*G06F 17/30* (2006.01)
(52) U.S. Cl. .................................. 707/816; 707/817
(58) Field of Classification Search ................. 717/151; 707/206, 816, 817, 999.206; 711/170, 151; 715/721

See application file for complete search history.

(56) References Cited

U.S. PATENT DOCUMENTS

| | | | |
|---|---|---|---|
| 5,748,881 A * | 5/1998 | Lewis et al. ................... 714/47 |
| 5,900,001 A * | 5/1999 | Wolczko et al. ............. 707/206 |
| 5,930,807 A * | 7/1999 | Ebrahim et al. ............. 707/206 |
| 6,035,303 A | 3/2000 | Baer et al. ................... 707/103 |
| 6,047,295 A * | 4/2000 | Endicott et al. ............. 707/206 |
| 6,070,173 A * | 5/2000 | Huber et al. ................. 707/206 |
| 6,093,216 A * | 7/2000 | Adl-Tabatabai et al. ...... 717/128 |
| 6,098,080 A * | 8/2000 | Endicott et al. ............. 707/206 |
| 6,098,089 A * | 8/2000 | O'Connor et al. ........... 718/104 |
| 6,167,535 A * | 12/2000 | Foote et al. ................... 714/38 |
| 6,289,360 B1 * | 9/2001 | Kolodner et al. ............. 707/206 |
| 6,324,631 B1 * | 11/2001 | Kuiper ......................... 711/170 |
| 6,353,838 B2 | 3/2002 | Sauntry et al. ............... 707/206 |
| 6,370,684 B1 * | 4/2002 | De Pauw et al. ............. 717/124 |
| 6,434,575 B1 * | 8/2002 | Berry et al. .................. 707/206 |
| 6,493,730 B1 * | 12/2002 | Lewis et al. ......................... 1/1 |
| 6,502,110 B1 * | 12/2002 | Houldsworth ............... 707/206 |
| 6,523,141 B1 | 2/2003 | Cantrill ........................ 714/48 |
| 6,622,226 B1 * | 9/2003 | Dussud ........................ 711/159 |
| 6,625,808 B1 * | 9/2003 | Tarditi ......................... 717/154 |
| 6,658,652 B1 * | 12/2003 | Alexander et al. .......... 717/128 |

(Continued)

OTHER PUBLICATIONS

Colnet, Dominique, et al., "Compiler Support to Customize the Mark and Sweep Algorithm", ISSM '98, Vancouver, British Columbia, © 1998, pp. 154-165.*

(Continued)

*Primary Examiner*—Robert Stevens
(74) *Attorney, Agent, or Firm*—Yee & Associates, P.C.; David A. Mims, Jr.

(57) ABSTRACT

An improved method, apparatus, and computer instructions for identifying a memory leak in a heap. Prior to the start of the observation period, all live objects in the heap are identified to form a set of live objects by altering an indicator in the live objects. After running the system for the required amount of time or until completion of the event being monitored, the system is used to obtain the list of live objects without the altered indicator. Live objects without the altered indicators form the most likely objects associated with a memory leak.

3 Claims, 3 Drawing Sheets

U.S. PATENT DOCUMENTS

| | | | |
|---|---|---|---|
| 6,675,379 B1 | 1/2004 | Kolodner et al. | 717/155 |
| 6,782,462 B2 | 8/2004 | Marion et al. | 711/170 |
| 7,234,080 B2* | 6/2007 | Cirne et al. | 714/38 |
| 7,302,515 B1* | 11/2007 | Detlefs | 711/6 |
| 7,313,661 B1* | 12/2007 | Dmitriev | 711/159 |
| 7,340,494 B1* | 3/2008 | Detlefs et al. | 707/206 |
| 7,428,560 B1* | 9/2008 | Detlefs et al. | 707/206 |
| 7,543,309 B2* | 6/2009 | Forin et al. | 719/331 |
| 2002/0107879 A1* | 8/2002 | Arnold et al. | 707/206 |
| 2003/0005027 A1* | 1/2003 | Borman et al. | 709/104 |
| 2003/0061597 A1 | 3/2003 | Curtis et al. | 717/128 |
| 2003/0200530 A1* | 10/2003 | Sayag | 717/114 |
| 2004/0039758 A1* | 2/2004 | Li | 707/206 |
| 2004/0078381 A1* | 4/2004 | Blandy et al. | 707/101 |
| 2004/0078540 A1 | 4/2004 | Cirne et al. | 711/170 |
| 2004/0122876 A1 | 6/2004 | Hudson et al. | 707/206 |
| 2004/0133895 A1 | 7/2004 | Dahlstedt et al. | 719/310 |
| 2004/0158589 A1* | 8/2004 | Liang et al. | 707/206 |
| 2004/0162930 A1* | 8/2004 | Forin et al. | 711/1 |
| 2005/0044540 A1* | 2/2005 | Savov | 717/166 |
| 2005/0071460 A1* | 3/2005 | Mitchell et al. | 709/224 |
| 2005/0081190 A1* | 4/2005 | Betancourt et al. | 717/124 |
| 2006/0136530 A1* | 6/2006 | Rossmann | 707/206 |
| 2006/0143595 A1* | 6/2006 | Dostert et al. | 717/127 |

OTHER PUBLICATIONS

Dor, Nurit, et al., "Checking Cleanness in Linked Lists", Lecture Notes in Computer Science, vol. 1824/2000, © 2000, pp. 115-135.*

Hirzel, Martin, et al., "On the Usefulness of Liveness for Garbage Collection and Leak Detection", Lecture Notes in Computer Science, vol. 2072/2001, © 2001, pp. 181-206.*

Siebert, Fridtjof, "The Impact of Realtime Garbage Collection on Realtime Java Programming", ISORC '04, May 14, 2004, pp. 33-40.*

Blackburn, Stephen M., et al., "Myths and Realities: The Performance Impact of Garbage Collection", SIGMETRICS/Performance '04, New York, NY, Jun. 12-16, 2004, pp. 25-36.*

Chen, G., et al., "Tuning Garbage Collection in an Embedded Java Environment", HPCA '02, Feb. 2-6, 2002, pp. 92-103.*

Domani, Tamar, et al., "Implementing an On-the-fly Garbage Collector for Java", ISMM '00, Minneapolis, MN, © 2000, pp. 155-166.*

Blackburn, Stephen M., et al., "Ulterior Reference Counting: Fast Garbage Collection Without a Long Wait", OOPSLA '03, Anaheim, CA, Oct. 26-30, 2003, pp. 344-358.*

Frampton, Daniel John, "An Investigation into Automatic Dynamic Memory Management Strategies using Compacting Collection", Dept. of Computer Science Australian National University, Bachelor's Subthesis, Nov. 2003, pp. i-xx and 1-114.*

Berlea, Alexandru, "Garbage Collection for the Delft Java Processor", Politehnica University of Bucharest, Delft University of Technology, Master's Thesis, Aug. 18, 1999, pp. i-x and 1-82.*

Richter, Jeffrey, "Garbage Collection: Automatic Memory Management in the Microsoft .NET Framework", MSDN Magazine, Nov. 2000, pp. 1-10.*

Mitchell, Nick, et al., "LeakBot: An Automated and Lightweight Tool for Diagnosing Memory Leaks in Large Java Applications", ECOOP 2003, LNCS 2743, Springer-Verlag, Berlin, Germany, © 2003, pp. 351-377.*

Ossia, Yoav, et al., "Mostly Concurrent Compaction for Mark-Sweep GC", ISSM '04, Vancouver, British Columbia, Canada, Oct. 24-25, 2004, pp. 25-36.*

Richter, Jeffrey, "Garbage Collection—Part 2: Automatic Memory Management in the Microsoft .NET Framework", MSDN Magazine, Dec. 2000, pp. 1-8.*

Persson, Patrik, et al., "An Interactive Environment for Real-Time Software Development", TOOLS 33, Mont-Saint-Michel, France, Jun. 5-8, 2000, pp. 57-68.*

Meehan, A., et al., "Java Garbage Collection—A Generic Solution?", Information and Software Technology, vol. 43, Issue 2, Feb. 2001, pp. 151-155.*

Chang, J. Morris, et al., "DMMX: Dynamic Memory Management Extensions", Journal of Systems and Software, vol. 63, Issue 3, Sep. 15, 2002, pp. 187-199.*

Srisa-an, Witawas, et al., "Active Memory Processor: A Hardware Garbage Collector for Real-Time Java Embedded Devices", IEEE Transactions on Mobile Computing, vol. 2, No. 2, Apr./Jun. 2003, pp. 89-101.*

Beebee, Jr., William S., et al., "An Implementation of Scoped Memory for Real-Time Java", EMSOFT 2001, LNCS 2211, Springer-Verlag, Berlin, Germany, © 2001, pp. 289-305.*

Reiss, Steven, "Visualizing Java in Action", ACM Symposium on Software Visualization, San Diego, CA, © 2003, pp. 57-65 and 210.*

Liang, Sheng, et al., "Comprehensive Profiling in the Java Virtual Machine", © 1999, pp. 1-12.*

Kim, Jin-Soo, et al., "Memory System Behavior of Java Programs: Methodology and Analysis", SIGMETRICS, Santa Clara, CA, © 2000, pp. 264-274.*

Borman, Sam, "Sensible Sanitation—Understanding the IBM Java Garbage Collector, Part 1: Object Allocation", developerWorks, Aug. 1, 2002, 8 pages, downloaded from: www-106.ibm.com/developerworks/ibm/library/i-garbage1/.*

Yang, Qian, et al., "Java Virtual Machine Timing Probes: A Study of Object Life Span and Garbage Collection", IPCCC 2002, Phoenix, AZ, Apr. 3-5, 2002, pp. 73-80.*

Mann, Tobias, et al., "Automatic Determination of Factors for Real-Time Garbage Collection", Washington University Technical Report #WUCS-04045, © 2004, pp. 1-13.*

* cited by examiner

METHOD AND APPARATUS FOR DETERMINING LEAKS IN A JAVA HEAP

BACKGROUND OF THE INVENTION

1. Technical Field

The present invention relates generally to an improved data processing system and in particular to a method and apparatus for processing data. Still more particularly, the present invention relates to a method, apparatus, and computer instructions for identifying memory leaks.

2. Description of Related Art

Data storage components, variables, collections, and multi-dimensional collections are used throughout all computer applications. During the execution of an application, the contents of these types of data storage elements will change or evolve. These changes occur due to modifications or updates to the data. These changes may be made by user input or through programmatic means.

In a Java virtual machine, a heap is a memory area, which contains all of the objects created by an application. During the course of executions, some objects may no longer be needed or used by an application. These types of objects are considered old objects. As more objects are created, the amount of space in the heap decreases. At some point in time, it is appropriate or useful to clear out or free objects that are no longer being used by an application. This process is referred to as garbage collection. In other words, the old objects are no longer needed by the program and can be removed or thrown out. This process involves memory recycling. When an object is old, the space in the heap occupied by this object may be recycled such that the space is made available for subsequent new objects. An object is considered old when the object is no longer referenced by a program or application. A program or application has a reference to an object, which allows the program or application to manipulate the object. A reference is similar to a pointer.

Even with memory recycling, memory leaks may occur. A memory leak is a condition caused by a program that does not free up the extra memory allocated by that program. When memory is allocated, but not deallocated, a memory leak occurs. In other words, the memory has leaked out of the computer. If too many memory leaks occur, these memory leaks can usurp all of memory and bring everything to a halt or slow the processing considerably.

In other environments, such as Java, the Java virtual machine (JVM) allocates and deallocates memory automatically. However, program level memory leaks can still occur. For example, programming errors can lead to object references still being held in a global data structure, which leads to reduced free space on the heap for allocating new objects. Memory leaks in a Java heap are currently very difficult to identify or diagnose. These types of memory leaks are especially difficult to determine or identify if the leak is intermittent or very slow. In some cases, a memory leak in a Java heap in a production system may take many days to manifest.

Currently, techniques used to find these leaks include tools such as Jinsight, Optimizeit profiler, and JPROF. Jinsight is a tool for visualizing and analyzing the execution of Java programs. Jinsight is available from Jinsight Informatica Ltda. Optimizeit profiler is a tool used to collect performance data during the execution of Java programs. Optimizeit profiler is available from Borland Software Corporation. JPROF is an IBM profiling tool, which is used to collect performance data pertaining to a running Java application.

These tools are all very invasive and require the use of the Java Virtual Machine Profiler Interface (JVMPI) to instrument the allocation path of the Java virtual machine (JVM) and to store information over time. JVMPI is an interface exposed by JVMs to enable tool vendors to develop profilers. This technique is much too heavy of a weight to employ in a product environment over the period of many days.

Therefore, it would be advantageous to have an improved method, apparatus, and computer instructions for determining memory leaks in a Java heap.

SUMMARY OF THE INVENTION

The present invention provides an improved method, apparatus, and computer instructions for identifying a memory leak in a heap. Prior to the start of the observation period, all live objects in the heap are identified to form a set of live objects by altering an indicator in the live objects. After running the system for the required amount of time or until completion of the event being monitored, the system is used to obtain the list of live objects without the altered indicator. Live objects without the altered indicators form the most likely objects associated with a memory leak.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
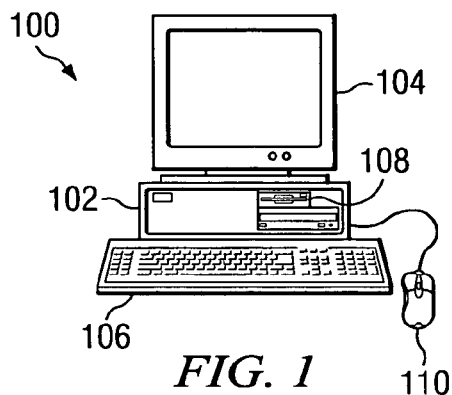
FIG. 1 is a pictorial representation of a data processing system in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108 such as floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
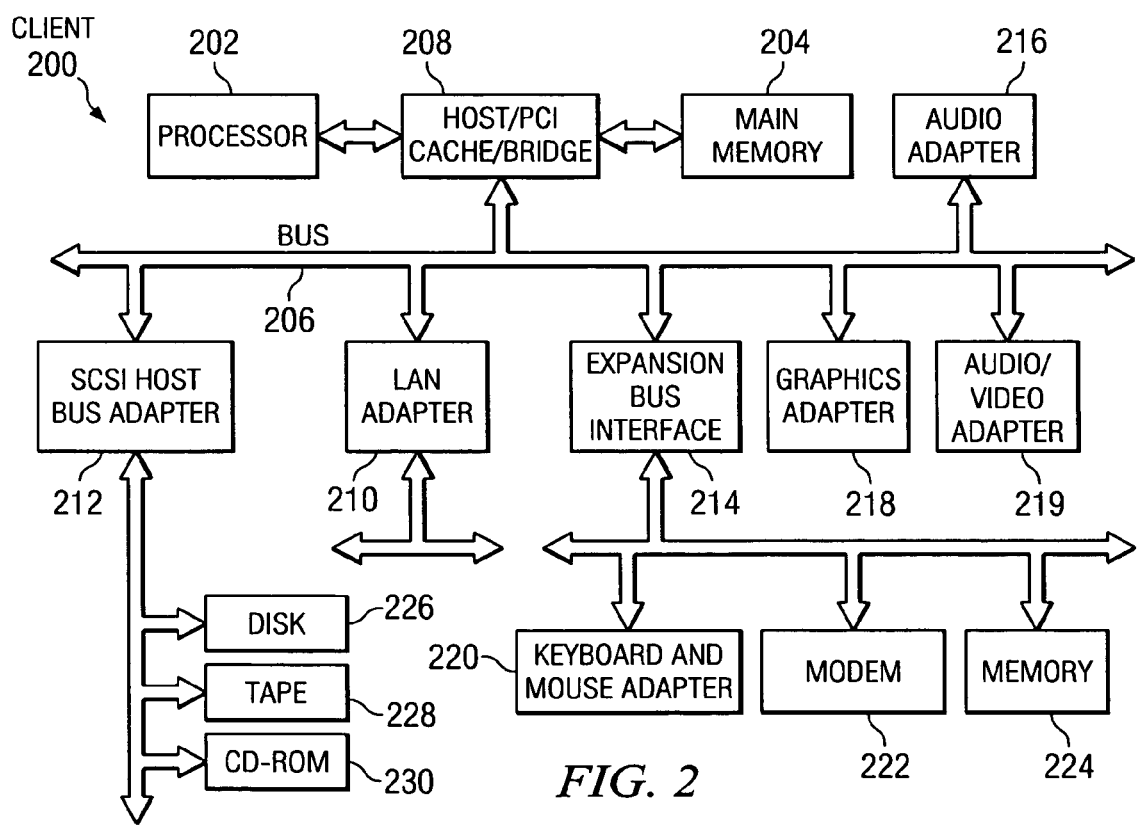
FIG. 2 is a block diagram of a data processing system in accordance with a preferred embodiment of the present invention.

FIG. 2 is a block diagram of a data processing system in which the present invention may be implemented. Data processing system 200 is an example of a computer, such as computer 100 in FIG. 1, in which code or instructions implementing the processes of the present invention may be located. Data processing system 200 uses a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 connect to PCI local bus 206 through PCI bridge 208. PCI bridge 208 also may include an integrated memory controller and cache memory for processor 202.

Additional connections to PCI local bus 206 may be made through direct component interconnection or through add-in connectors. In the depicted example, local area network (LAN) adapter 210, small computer system interface (SCSI) host bus adapter 212, and expansion bus interface 214 connect to PCI local bus 206 by direct component connection. In contrast, audio adapter 216, graphics adapter 218, and audio/video adapter 219 connect to PCI local bus 206 by add-in boards inserted into expansion slots. Expansion bus interface 214 provides a connection for a keyboard and mouse adapter 220, modem 222, and additional memory 224. SCSI host bus adapter 212 connects to hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
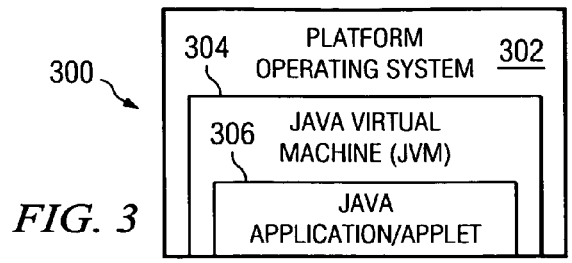
FIG. 3 is a block diagram illustrates the relationship of software components operating within a computer system that may implement the present invention.

FIG. 3 is a block diagram illustrating the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks and platform independence.

The JVM is a virtual computer, i.e. a computer that is specified abstractly. Certain features are present in every JVM, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes are translated into native code by a just-in-time compiler or JIT.

A JVM loads class files and executes the bytecodes within them. More specifically, a class loader in the JVM loads these class files. The class loader loads class files from an application and the class files from the Java application programming interfaces (APIs), which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
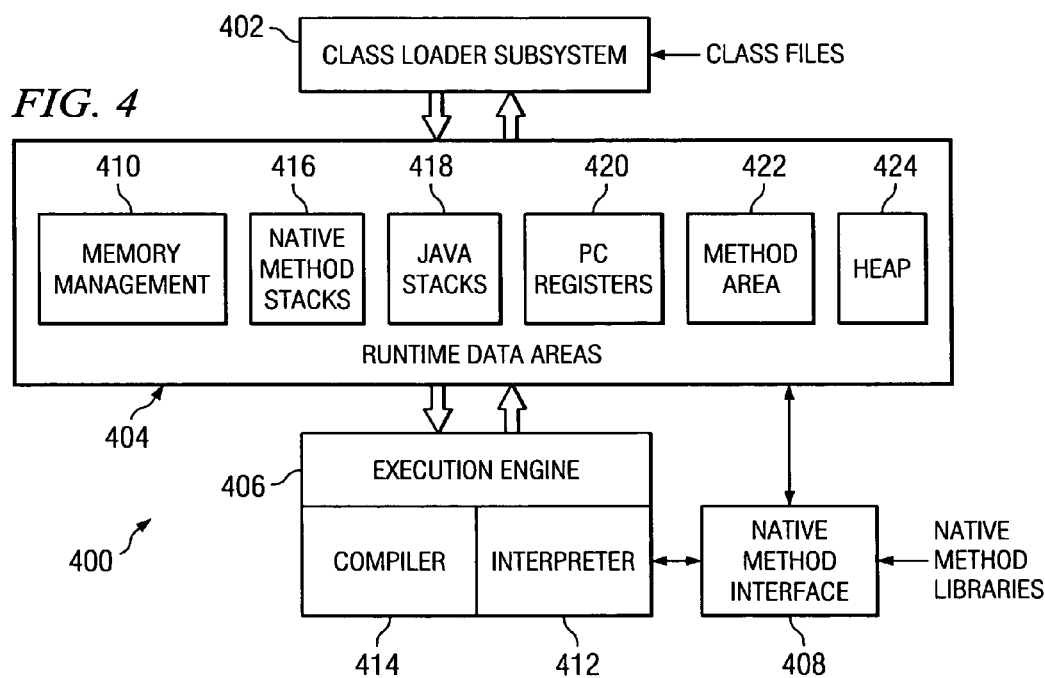
FIG. 4 is a block diagram of a Java virtual machine in accordance with a preferred embodiment of the present invention.

FIG. 4 is a block diagram of a JVM in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 store the state of Java method invocations. When a new thread is launched, the JVM creates a new Java stack for the thread. The JVM performs only two operations directly on Java stacks: it pushes and pops frames. A threads Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data, while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424, but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The garbage collector performs operations generally referred to as mark/sweep/compact. These operations are the marking of live objects and coalescing sequences of dead objects and spaces that are not marked as live to thereby free or reclaim memory space. Any fragmentation caused by the live objects within the heap is compacted during the compact operation. Compaction is a process that moves objects toward one end of the heap with the goal of creating the largest possible contiguous free area or areas. Compaction helps to avoid allocating new memory to expand the heap size. Objects are marked (noted as live) by following chains of references from a set of root objects to all other objects they reach. Marks are recorded in an area of memory allocated outside of the heap, referred to as a mark bit array. A single bit in the mark bit array is set as each new live object is discovered.

The present invention provides an improved method, apparatus, and computer instructions for determining or identifying memory leaks in a heap, such as Java heap. The mechanism of the present invention employs an extra bit in the header of each object in the heap. Extra bits may be found in most object implementations. After a normal mark-sweep-compact operation cycle, a user driven mark operation sets a bit in the live objects. This bit is used to identify objects that have not been deallocated at the start of the observation period. The user driven mark operation can also be treated as, for example, a periodic event, such as the passage of some period of time in order to constantly monitor the health of the heap. The period of time may be for example, one hour or several days.

Figure 5:
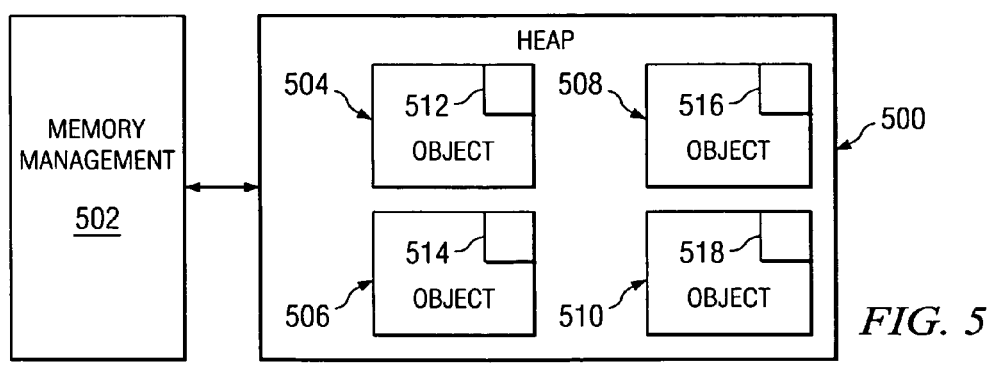
FIG. 5 is a diagram illustrating components used to identify leak in a heap in accordance with a preferred embodiment of the present invention.

Next FIG. 5 is a diagram illustrating components used to identify leak in a heap in accordance with a preferred embodiment of the present invention. Heap 500 in this example is a Java heap and may be implemented as heap 424 in FIG. 4. Memory management 502 manages heap 500 and may be implemented as memory management 410 in FIG. 4. Memory management 502 provides management function, including allocating and deallocating objects in heap 500. Additionally, in these illustrative examples, memory management 502 also includes processes for identifying memory leaks in heap 500.

As illustrated in FIG. 5, heap 500 contains objects 504, 506, 508, and 510. Additionally, indicators 512, 514, 516, and 518 are present in objects 504, 506, 508, and 510. These indicators take the form of bits in this illustrative example. Of course, the indicators may take other forms, such as a flag or a tag that is associated with the object rather than actually being incorporated within the objects.

In one illustrative embodiment, all live objects in heap 500 have their indicators set or marked by memory management 502. In this illustrative example, indicators 512, 514, 516, and 518 are marked by memory management 502 for objects 504, 506, 508, and 510. The system is then allowed to run in the production environment over the leakage period. This period of time can last for hours, days, or even weeks. No additional overhead is present while the system leaks. When the observation period ends or when a required event occurs, for example, when the heap gets full or near full, an OutOfMemory exception, a mark-sweep-compact operation is triggered to get the set of actual live objects. Then, memory management 502 performs a query of live objects in heap 500. Memory management 502 marks all objects in heap 500 that do not have their indicator marked and presents these to the user in these illustrative examples. These unmarked objects are new objects and the predominant type that are most likely to be a leaked object. This mechanism is useful for memory leaks, which happen over large periods of time.

Alternatively, the mechanism of the present invention in memory management 502 clears all indicators on currently live objects and then turns on a JVM-wide marking function. The marking operation is triggered on each allocation operation within the JVM and sets the indicator within the created object. This allocation operation may be initiated by an application needed to create an object. When the transaction is over or the observation period has ended, a mark-sweep-compact is triggered to get a set of actual live objects. The presence of marked objects in heap 500 after this step implies the presence of possible memory leaks. A dump of marked objects in heap 500 provides an indication of the source of the memory leak. By identifying objects involved in a memory leak, the processes creating those objects may be determined. As a result, programmers or other designers may alter these processes analyze these processes as part of a memory leak analysis.

Figure 6:
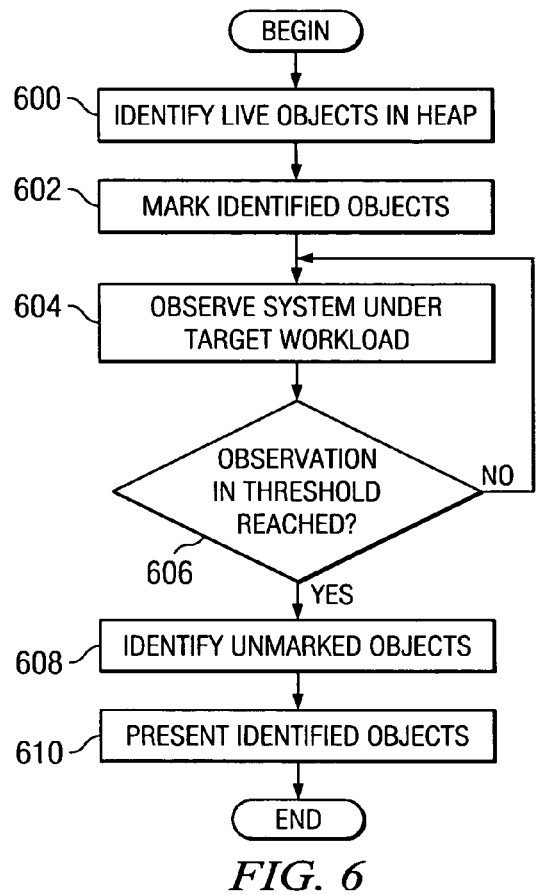
FIG. 6 is a flowchart of a process for Identifying memory leaks in accordance with a preferred embodiment of the present invention.

FIG. 6 is a flowchart of a process for identifying memory leaks in accordance with a preferred embodiment of the present invention. The process illustrated in FIG. 6 may be implemented in a management process, such as memory management 502 in FIG. 5.

The process begins by identifying live objects in a heap (step 600). The identification process is a mark-sweep-compact operation. Most JVMs have a method to trigger garbage collection programmatically which can be used for the above purpose. The process marks identified live objects through a user driven mark operation (step 602). In these examples, the process marks the objects by setting an indicator, such as a bit in the header of the objects. The system is exposed to the workload, which seems to cause the memory leak. This workload is also referred to as a target workload. Thereafter, process observes the system under a target workload (step 604).

Next, a determination is made as to whether the observation period threshold has been reached (step 606). This threshold may be set in a number of different ways. For example, the threshold may be reached as to when the heap is full or 90 percent full. Another possible example is a user-specified end of observation period. If the observation threshold is reached, the process identifies the unmarked objects (step 608). In this illustrative example, the unmarked objects are objects most likely associated with a memory leak in the heap. The process then presents the identified objects (step 610), with the process terminating thereafter. These objects may be presented in a number of different ways. For example, a listing of objects may be presented or a graphical representation of the objects may be displayed in a graphical user interface (GUI).

With reference again to step 606, if the number of objects do not reach the observation threshold, the process returns to step 604.

Figure 7:
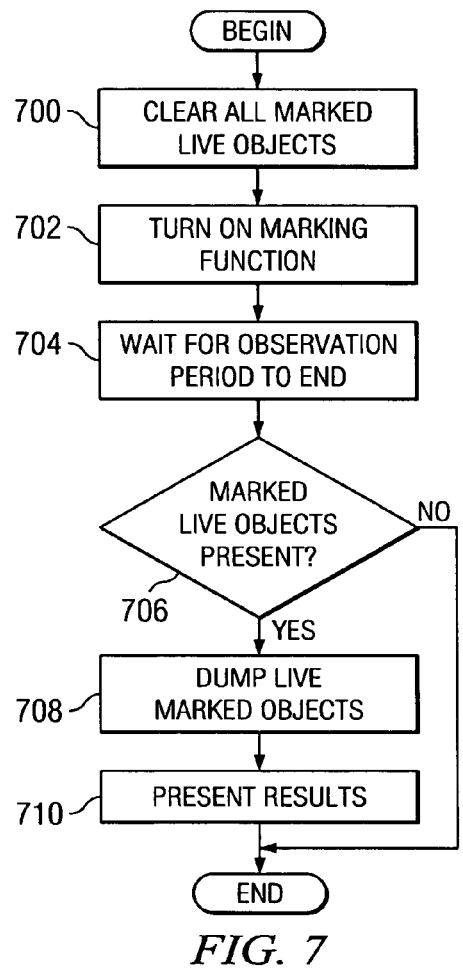
FIG. 7 is a flowchart of a process for identifying memory leaks in accordance with a preferred embodiment of the present invention.

Next, FIG. 7 is a flowchart of a process for identifying memory leaks in accordance with a preferred embodiment of the present invention. The process illustrated in FIG. 7 may be implemented in a management process, such as memory management 502 in FIG. 5.

The process begins by cleaning the heap (mark-sweep-compact) and clearing all live marked objects in the heap (step 700). The process turns on the marking function (step 702). The marking function in step 702 sets the indicator in each new object being allocated hence. The process then waits for the observation period to complete (step 704). The end of the observation period can be denoted by the end of a transaction or user specified time period or a user input.

Next, a determination is made as to whether any live marked objects are present (step 706). If live marked objects are present, the process dumps the live marked objects (step 708). These live marked objects are objects most likely causing the memory leak. Thereafter, the process presents the results of the dump (step 710), with the process terminating thereafter. The process proceeds to step 710 in step 706, if live marked objects are not present in the heap.

Figure 8:
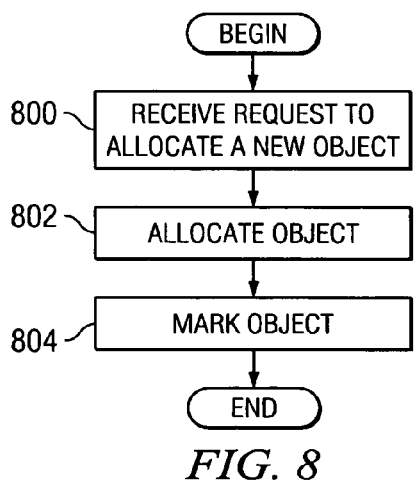
FIG. 8 is a flowchart of a process for a marking function in accordance with a preferred embodiment of the present invention.

In FIG. 8 is a flowchart of a process for a marking function in accordance with a preferred embodiment of the present invention. The process illustrated in FIG. 8 may be implemented in memory management 502 in FIG. 5 in these illustrative examples. The marking function is called by the JVM memory management after allocation of a new object.

The process begins by receiving a request to allocate a new object (step 800). The process allocates the object (step 802), and the process marks the object (step 804), with the process terminating thereafter.

The setting and resetting of bits or indictors may be preformed using interfaces supported by the JVM. These interfaces include, for example, ones supported by Java virtual machine tools interface (JVMTI).

Thus, the present invention provides and improved method, apparatus and computer instructions for identifying memory leaks. The mechanism of the present invention employs indicators associated with objects in a heap. These indicators may be contained within the objects or may reference the objects. Live objects are identified and the indicators for these live objects are set or unset in the heap depending on the particular implementation. After an event occurs, the heap is examined and objects likely to be associated with a memory leak may be identified through locating marked or unmarked live objects still present in the heap.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for identifying a memory leak in a heap, wherein the heap comprises a plurality of objects, the computer implemented method comprising:

responsive to a processor completing a mark-sweep-compact operation in the heap, clearing an indicator associated with each object in the plurality of objects, wherein the indicator is located in a bit in a header of the each object;

initiating a marking operation at a beginning of a user-defined observation period;

responsive to an allocation of memory to a new object during the user-defined observation period, marking, by the marking operation, the indicator associated with the new object when the new object is allocated;

adding the new object to the heap;

responsive to an expiration of the user-defined observation period, identifying objects in the heap having a marked indicator, wherein the identified objects are sources of memory leaks;

displaying a graphical representation of the identified objects; and removing the identified objects from the heap.

2. A data processing system for identifying a memory leak in a heap, wherein the heap comprises a plurality of objects, the data processing system further comprising:

a bus;

a storage device connected to the bus, wherein the storage device contains computer usable code; and a processing unit connected to the bus, wherein the processing unit executes the computer usable code to clear an indicator associated with each object in the plurality of objects, wherein the indicator is located in a bit in a header of the each object, responsive to completing a mark-sweep-compact operation in the heap; initiate a marking operation at a beginning of a user-defined observation period; mark, by a marking operation, the indicator associated with a new object in response to the new object being allocated add the new object to the heap; identify objects in the heap having the marked indicator, responsive to-an expiration of the user-defined observation period wherein the identified objects are sources of memory leaks; display a graphical representation of the identified objects; and remove the identified objects from the heap.

3. A computer program product embodied in a computer readable recordable-type storage medium storing executable instructions for identifying a memory leak in a heap, wherein the heap comprises a plurality of objects, the computer program product comprising:

instructions for clearing an indicator associated with each object in the plurality of objects, wherein the indicator is located in a bit in a header of the each object responsive to completing a mark-sweep-compact operation in the heap;

instructions for initiating a marking operation at a beginning of a user-defined observation period;

instructions for marking, by the marking operation, the indicator associated with a new object in response to memory being allocated to the new object;

instructions for responsive to an expiration of the user-defined observation period, identifying objects in the heap having a marked indicator, wherein the identified objects are sources of memory leaks;

instructions for displaying a graphical representation of the identified objects; and instructions for removing the identified objects from the heap.

* * * * *